(No Model.)  3 Sheets—Sheet 1.
W. R. JOHNS.
CAR BRAKE.
No. 268,683.   Patented Dec. 5, 1882.
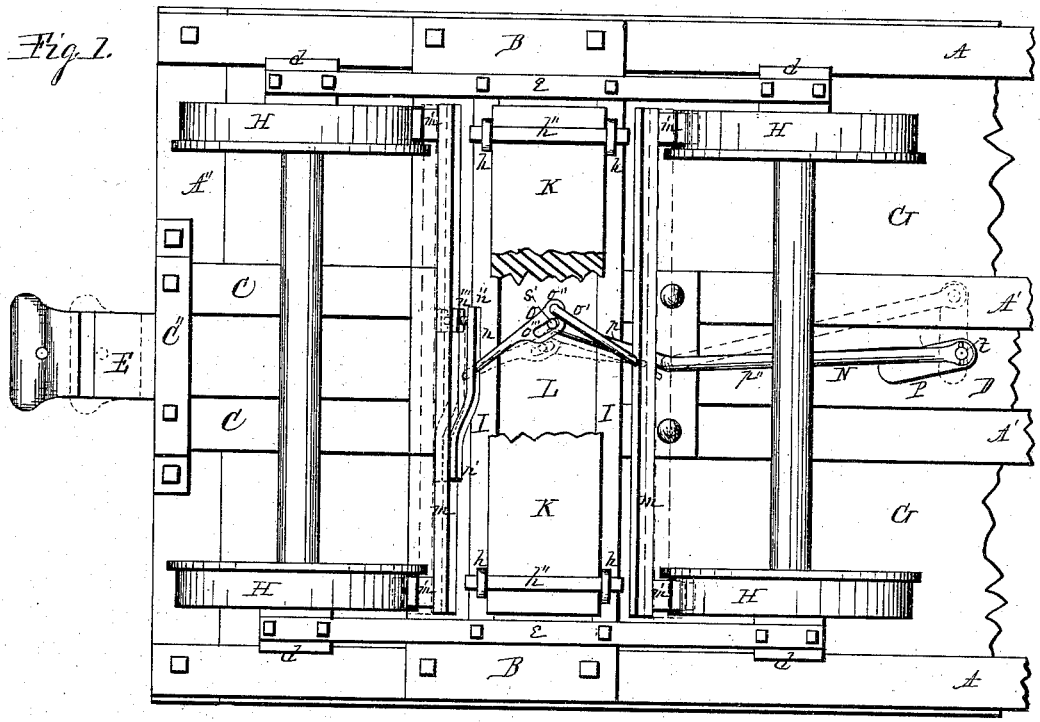
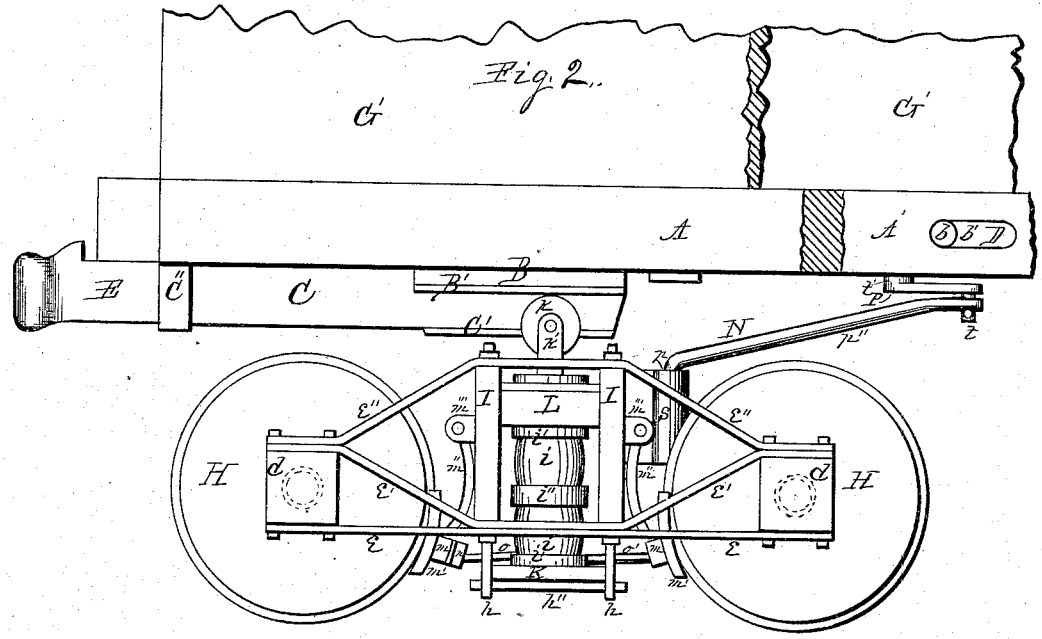
Witnesses.
F. J. Sovereign
A. O. Behel
Inventor.
Will R. Johns,
Per Jacob Behel.
Atty.

(No Model.)

W. R. JOHNS.
CAR BRAKE.

No. 268,683. Patented Dec. 5, 1882.

Witnesses.
F. J. Sovereign
A. O. Behel

Inventor.
Will. R. Johns.
Per Jacob Behel.
Atty.

(No Model.) 3 Sheets—Sheet 3.
W. R. JOHNS.
CAR BRAKE.
No. 268,683. Patented Dec. 5, 1882.
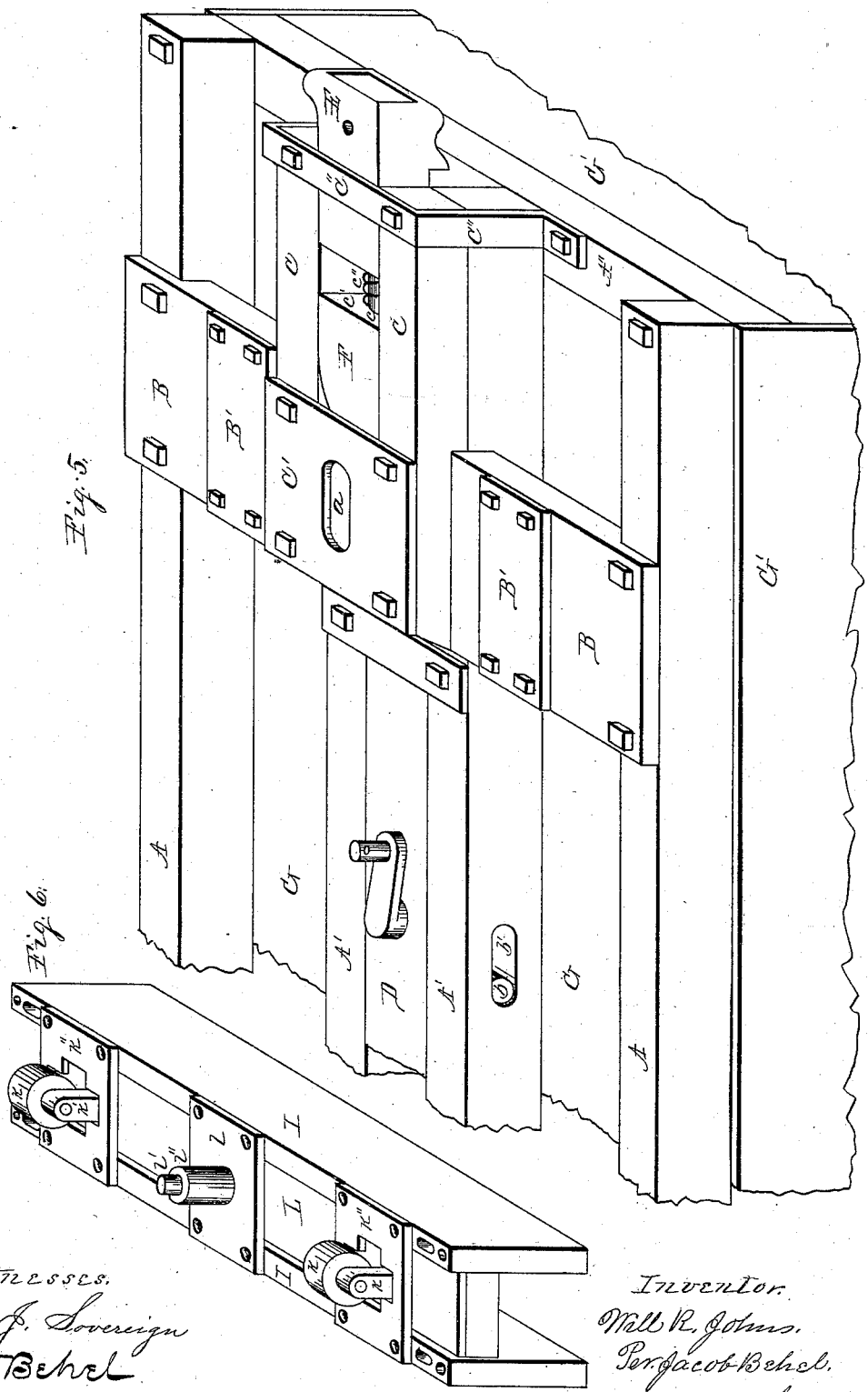

UNITED STATES PATENT OFFICE.

WILL R. JOHNS, OF ROCKFORD, ILLINOIS.

CAR-BRAKE.

SPECIFICATION forming part of Letters Patent No. 268,683, dated December 5, 1882.

Application filed May 19, 1882. (No model.)

*To all whom it may concern:*

Be it known that I, WILL R. JOHNS, a citizen of the United States, residing in the city of Rockford, in the county of Winnebago and State of Illinois, have invented a new and useful Improvement in Car-Brakes, of which the following is a specification.

This invention relates to brakes employed on railroad-cars to engage the wheels to retard the running speed of the train, and relates more especially to that class of brakes known as "automatic" brakes.

The object of this invention is to provide a brake capable of use for the purposes of a brake to be operated by the movements of the engine to which the cars are attached. To accomplish this object I have designed and constructed the brake mechanism represented in the accompanying drawings, in connection with portions of a railroad-car of ordinary construction, all of which will be hereinafter more fully described.

Figure 3:
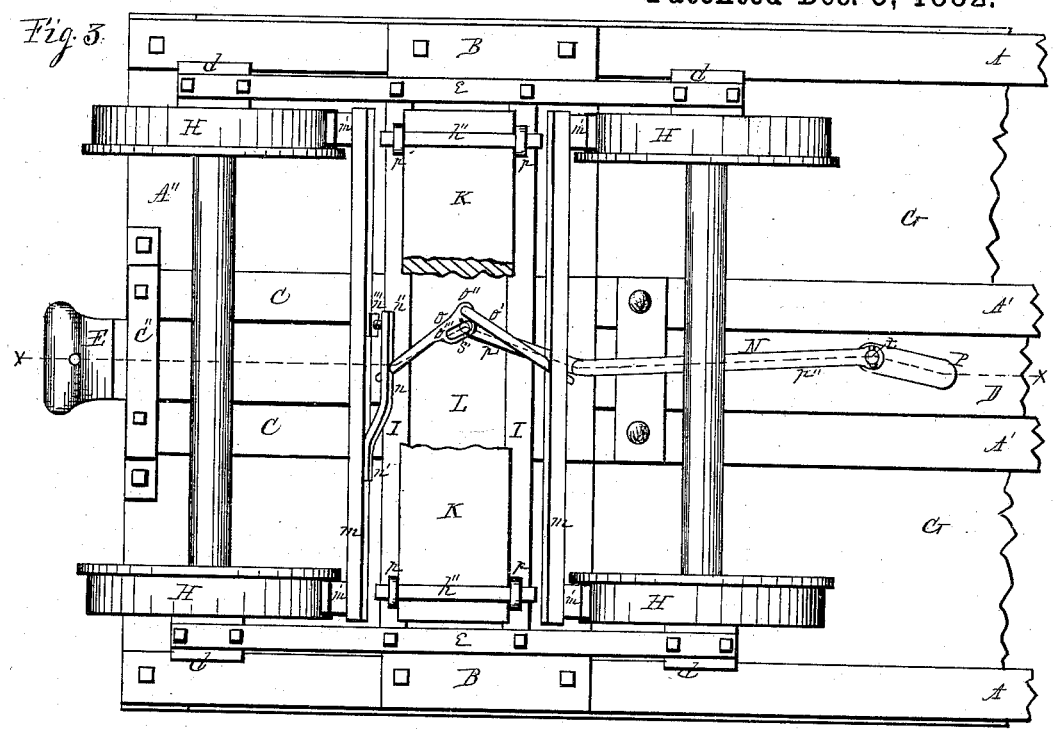
Figure 4:
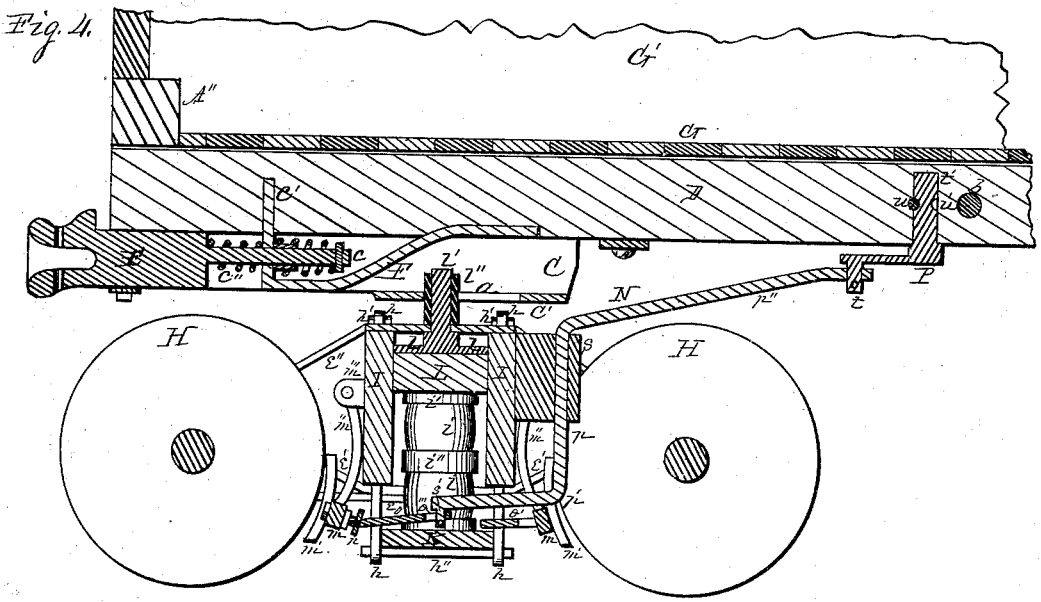

In the accompanying drawings, Figure 1 is a plan view of the under face or bottom of a car-truck and a portion of a car mounted thereon, embodying my invention, of which Fig. 2 is a side elevation. Fig. 3 is also a plan view of the under face or bottom of a car-truck and a portion of a car mounted thereon, in which the draw beam or bar is shown in a different position to that shown in Fig. 1. Fig. 4 is a lengthwise vertical central section on dotted line $x$. Fig. 5 is an isometrical representation of the bottom or under face of a portion of a car, and Fig. 6 is an isometrical representation of the spring-bolster of the truck on which the car is supported.

In the several figures of the drawings, A represents the outer, and A' the inner, lengthwise beams supporting the floor of the car.

At A'' is represented a crosswise end beam securely bolted to the upper side of the end portion of the lengthwise beams.

At B are represented transverse bearing-beams fixed to the under face of the lengthwise beams A and A', in position thereon to be about centrally over the truck-frame when mounted thereon.

At B' are represented metallic bearing-plates fixed to the under face of the transverse bearing-beams B, in position to receive the carrying-rollers of the truck-frame.

At C are represented short beams placed on the under surface and end portions of the inner lengthwise beams, A', to which they are securely fixed.

At C' is represented a bolster-plate on the inner end portions of the short beams, C, to which they are fixed in the same transverse line in which the bearing-beams B are placed. The center of this bolster-plate is provided with an elongated slot, $a$, to receive the king-bolt to connect the car-truck with the car-frame. The lengthwise axis of this slot extends in the lengthwise direction of the car-frame, and is employed to permit a limited independent movement of either the truck or the car, for a purpose to be hereinafter described.

At C'' is represented a metallic bar of staple or stirrup like form, fitted to embrace the outer ends of the inner lengthwise beams, A', and of the short beams C, fixed to the under sides of the inner lengthwise beams, A'. This stirrup-formed bar is securely fixed to the lengthwise beams by sufficient bolts passed through the parts and through the crosswise end beam, and its foot portions are also bolted to the crosswise end beam.

At D is represented a draft-beam placed between the inner lengthwise beams, A'; and its center portion is provided with a transverse draw-pin, $b$, passed horizontally through the beam and having its projecting ends extending through the slots $b'$, formed in the inner lengthwise beams, A', to receive them, to permit of a free but limited endwise movement of the draft-beam.

At E is represented a draft-head having its outer end fitted to receive a suitable draft-link and draft-pin in the usual manner. This draft-head is placed on the under side of the end portions of the draft-beam D and over the stirrup-formed bar C''. The inner end portion, $c$, of this draft-head is produced in bar form and extends through a suitable opening in the vertical portion $c'$ of a guide-bar, F, fixed to the center draft-beam, D.

At $c''$ are represented spiral springs placed upon the bar end portion $c$ of the draft-head, on each side of the guide-bar F, in such a manner as to produce a spring draft-head.

At G is represented a portion of the floor of the car, consisting of suitable plank fixed to the upper surface of the lengthwise beams in any suitable manner.

At G' is represented a portion of the side and end walls of the car, which rise from the side and end edges of the floored portion thereof.

At H are represented the wheels of the car-truck mounted on the axle-trees, to which they are securely fixed. The outer ends of these axle-trees are fitted in journal form, which receive suitable box-bearings $d$. These box-bearings, on each side of the truck, are suitably separated and are joined and supported in their separated position by means of a truss-frame, consisting of the several bars $e, e'$, and $e''$, suitably joined to each other and to the box-bearings.

At I are represented suitable bearing-beams, having their end portions placed between the bars of the end truss-frames at the angle-points of the bent upper truss-bars, $e'$ and $e''$, and are fixed in position thereto by means of suitable bolts, which are passed vertically through the parts. These beams extend crosswise of the trucks parallel with the axle-trees, and inside of their connection with the truss end frames are provided with stirrup-links $h$, which extend through the beams vertically; and their upper ends are provided with saddle-blocks $h'$, resting upon the upper edge of the beams, and their lower ends receive the end portions of a bearing-bar, $h''$.

At K is represented a spring supporting-beam having its ends which receive the springs, supported on the bearing-bars $h''$.

At $i$ are represented rubber springs provided with end washers, $i'$, and center washers, $i''$, all of suitable cup form.

At L is represented a car-supporting beam, placed between the vertical cross-beams of the truck-frame, having its ends supported on the springs.

At $k$ are represented rollers employed to support the car-body. These rollers have their journal-supports in stud-ears $k'$, which rise from a suitable foot-plate fixed to the upper surface of the car-supporting beam L, and extend up through suitable guideways formed in guide-plates $k''$, fixed to the upper edges of the end portions of the vertical bearing-beams I.

At $l$ is represented a bolster-plate fixed centrally to the upper edges of the bearing-beams I; and this bolster-plate is provided with a king-bolt, $l'$, of stud form, projecting centrally from its upper surface. This king-bolt stud is provided with an anti-friction roller, $l''$, of suitable dimensions to enter the elongated slot $a$ in the bolster-plate C' on the under side of the car.

The relative position of the supporting-rollers $k$ and the metallic bearing-plates B' are such that when the car-body is mounted upon the trucks with the king-bolt entering the elongated slot, the supporting-rollers $k$ will engage the metallic bearing-plates B' in a manner to support the car-body and permit of an endwise movement of the car-body on truck, either forward or rearward, limited by the length of the slot, or permit of an independent back-and-forth movement of the truck under the car, limited by the length of the slot in the bolster-plate on the bottom of the car.

At $m$ are represented brake-bars having their end portions fitted with brake-shoes $m'$. These bars are placed between the truck-wheels parallel with the axle-trees, and are suspended to the truck-frame by means of links $m''$, by which they are capable of a swinging movement in the lengthwise direction of the car and are in position to cause the brake-shoes to engage the periphery of the wheels.

At $n$ is represented a plate-spring having one of its ends at $n'$ fixed to the brake-bar, and its free end at $n''$ supported on an adjusting screw-bolt, $n'''$, by means of which the spring can be adjusted to or from the bar.

At $o$ and $o'$ are represented toggle-jointed levers having one of their ends pivoted to each other, as at $o''$, producing a hinge-joint. The outer end of the lever $o$ has a pivotal connection with the central portion of the plate-spring $n$ on the brake-bar, and the outer end of the lever $o'$ has a pivotal connection with the central portion of the brake-bar opposite to the bar to which the spring is attached.

At $o'''$ is represented a slot formed in the end portion of the lever $o$ near its pivotal connection with the lever $o'$.

At N is represented a crank-formed lever, consisting of a central vertical arm, $p$, a lower horizontal or slightly inclined arm, $p'$, and an upper horizontal or slightly-inclined arm, $p''$. The central vertical portion, $p$, of this lever is supported to oscillate in a suitable bearing, $s$, projecting centrally from the vertical side of one of the vertical crosswise-bearing beams I. The lower arm, $p'$, of this lever extends over one of the brake-bars, having its free end provided with a wrist-pin, $s'$, which enters the slot $o'''$ in the toggle-lever $o$ near its pivotal connection with the toggle-lever $o'$. The upper arm, $p''$, of this lever has its free end made in eye form to receive the wrist-pin $t$ of the crank P. The shaft $t'$ of the crank P is supported to oscillate in a suitable bearing in the central draft beam, D, and is held in position by means of a transverse pin, $u$, which enters the groove $u'$, formed in the shaft $t$ of the crank.

From the foregoing it will be seen that the construction and arrangement of my improvements are such that in use in starting the car the draft upon the draft-head E, by means of its connection with the center draft-beam, D, will cause the beam to slide forward under the body of the car until the transverse draft-pin $b$ comes in contact with the forward end of the slot $b'$ in the inner lengthwise beams, A', as seen in Fig. 2; and the continued draft will cause the body of the car to move upon the supporting-rollers $k$ until the king-bolt $l'$, or the anti-friction roller $l''$, mounted thereon, comes in contact with the rear end of the slot $a$ in the bolster-plate C' on the car-body, when the truck will be in its farthest position from the end of the car, as shown in Figs. 1 and 2; and the crank P, the crank-formed lever N, and the toggle-jointed levers $o$ and $o'$ will be in the position represented in the Figs. 1 and 2, and the brake-bars m will also be in their position shown in the same figures, and the brake-shoes will be disengaged from the truck-wheels, when the car will be free to move forward.

When it is desired to retard the movement of the cars or train, or to stop the train, it will only be necessary to reverse the engine, which action will operate, through the draft-heads by means of their connection with the draft-beams, to cause the draft-beams to slide rearward under the cars, or, rather, to hold the draft-beams and permit the cars to move forward over them until the transverse draft-pin $b$ in the central draft-beam comes in contact with the rear end of the slot $b'$ in the inner lengthwise beams, A', as shown in Fig. 5. This movement of the central draft-beam will cause the crank P, the crank-formed lever N, and the toggle-levers $o$ and $o'$ to move to their dotted-line position, as shown in Fig. 5. This action, by means of the toggle-lever connection with the brake-bars m, will cause them to separate and press the brake-shoes against the periphery of the truck-wheels and operate to stop the train.

When it is required to back the train the backward movement of the engine will operate to cause the cars to move on their roller-supports rearward on the wheeled trucks until the king-bolt stud or the anti-friction roller mounted thereon comes in contact with the forward end of the slot $a$ in the bolster-plate C on the car-body, as shown in Fig. 4, when the truck will be in its nearest position to the end of the cars, as shown in Figs. 3 and 4, and the crank P, the crank-formed lever N, and the toggle-jointed levers $o$ and $o'$ will be in the position represented in the Figs. 3 and 4, and the brake-bars m will also be in their position, (shown in the same figures,) and the brake-shoes will be disengaged from the truck-wheels, when the cars will be free to move backward.

When it is required to stop the backward movement of the train, the reverse or forward movement of the engine will put the parts in the position shown in the dotted lines in Figs. 1 and 2 and apply the brakes to stop the train, and when stopped the same action of the engine will cause the car-body to move forward on the roller-supports, and will disengage the brakes and permit the train to move forward, as hereinbefore described.

From the foregoing it will be seen that I produce an automatic brake operated by the forward and backward movement of the engine, and capable of all the requirements of an efficient brake in the management or handling of a train of cars. In the foregoing I have employed an anti-friction roller, $l''$, placed upon the stud-formed king-bolt; but this anti-friction roller may be omitted and a stud-bolt of suitable dimensions may be employed without the roller.

I claim as my invention—

1. The combination, with the brake-bars fitted with brake-shoes, and a toggle-jointed lever-connection with the brake-bars, of a pivoted lever connected with the toggle-jointed levers, and a crank-connection with the endwise-moving draft-beam, substantially as and for the purpose hereinbefore set forth.

2. The combination, with a draft-bar capable of a limited lengthwise movement independent of the car-body and with a pivoted lever connected with the brakes, of a crank having a pivotal connection with the draft-beam and with the pivoted lever, substantially as and for the purpose hereinbefore set forth.

3. The combination, with the brake-bar and with the toggle-jointed levers, of a spring fixed to the spring-bar, and the toggle-jointed lever having a pivotal connection therewith, and the spring made adjustable, substantially as and for the purpose hereinbefore set forth.

4. The combination, with the toggle jointed levers having a pivotal connection with the brake-beams, a pivoted lever having a pivotal connection with the toggle-jointed levers, of a crank having a pivotal connection with the draft-beam and with the said pivoted lever, substantially as and for the purpose hereinbefore set forth.

5. The combination, with the brake-bar of a car-truck, of a spring fixed thereto at one end, and being provided at the other with an adjusting device connected with the brake-bar, substantially as and for the purpose hereinbefore set forth.

WILL R. JOHNS.

Witnesses:
JACOB BEHEL,
A. O. BEHEL.